Feb. 25, 1964 R. CUNY 3,122,668
ARRANGEMENT FOR INDICATING LEAKAGE BETWEEN
COOLING SYSTEMS OF TURBO-GENERATORS
Filed July 27, 1960
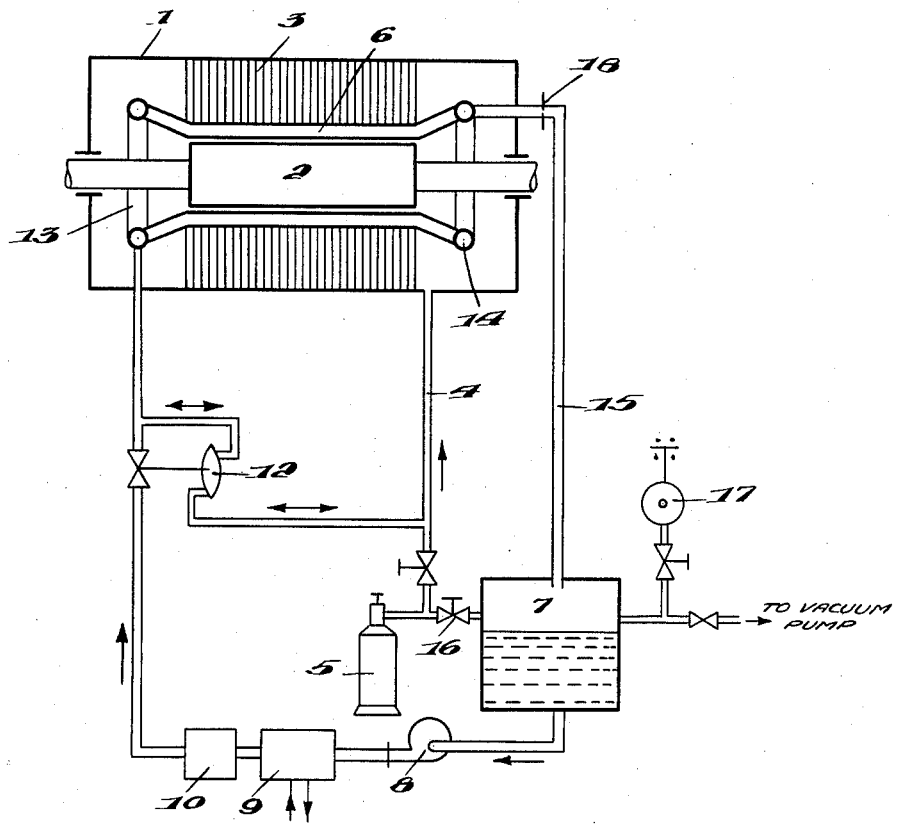
INVENTOR
Robert Cuny
BY Pierce, Scheffler & Parker
ATTORNEYS United States Patent Office 3,122,668
Patented Feb. 25, 1964

3,122,668
ARRANGEMENT FOR INDICATING LEAKAGE BETWEEN COOLING SYSTEMS OF TURBO-GENERATORS
Robert Cuny, Wettingen, Aarg, Switzerland, assignor to Aktiengesellschaft Brown, Boveri & Cie, Baden, Switzerland, a joint-stock company
Filed July 27, 1960, Ser. No. 45,659
Claims priority, application Switzerland July 31, 1959
6 Claims. (Cl. 310—53)

This invention relates to turbogenerator machines and more particularly to an improved arrangement for detecting any leakage which may occur between the respective cooling systems utilized for the rotor and stator elements of the machine.

In high-output turbogenerators it is customary to provide the machine casing with a hydrogen gas charge, the hydrogen gas being used primarily for cooling the rotor and for reducing the friction losses in the air gap. The cooling of the stator winding is now effected, in order to increase the output of the machine, by a direct cooling of the slot conductors by means of a liquid, particularly oil or water, the liquid flowing within the slot zone or the conductors (tubular conductors) so that the heat generated in the winding is carried away directly.

In hydrogen-cooled turbogenerators of this type, the gas pressure in the machine is kept higher than the pressure of the liquid or oil respectively used for direct cooling of the stator winding. This pressure gradient between the two cooling systems makes it also possible to detect a leak in the liquid system inside the generator. To this end it is known to withdraw gas from a suitable point of the cooling liquid circuit under vacuum and to supply it to a gas analyzer, the presence of hydrogen gas being used to detect a possible leak. Such an indicating and warning device is rather complicated, however, due to the necessary vacuum system with all its accessories, and therefore expensive.

It is the object of the invention to provide an arrangement for indicating leaks between the cooling systems of a turbogenerator with combined hydrogen and liquid cooling, which needs no vacuum plant and which is consequently much simpler than the present indicating systems. According to the invention this is achieved in this way that the cooling of the stator winding is effected in a closed circuit by means of de-aerated liquid, which is saturated with a gas that is inert to the liquid and which always has a lower pressure than the cooling gas inside the machine, and that an indicating device is arranged in the cooling liquid circuit which indicates the penetration of cooling gas into the cooling liquid system, due to a leak.

The cooling of the rotor of the turbogenerator is effected mostly by means of a hydrogen gas charge, the gas being circulated in known manner, on the one hand, along the rotor surface and in the air gap respectively and, on the other hand, through axial cooling channels in the rotor body itself and, if necessary, in the slots for the rotor winding or through the rotor winding comprising tubular conductors. For the direct cooling of the stator winding, some bar conductors of the winding are designed as tubular conductors, through which completely de-aerated oil or water is forced. The de-aeration of the oil can be effected by evacuation or by displacement by means of a gas. The oil circuit is sealed air-tight and is under a slight over-pressure at the inlet end of the winding, compared to the atmosphere. If the liquid pressure at the outlet end of the winding is lower than the atmospheric pressure, measures for preventing the entrance of air into the cooling liquid, which are known in themselves, are provided. The liquid, for instance oil, is saturated at the point of the lowest pressure with a gas that is inert to oil, the simplest way being to use the same gas as for the cooling gas charge, namely, hydrogen. Another neutral gas, for example, nitrogen, can be used as saturation gas. In order to prevent gas bubbles from issuing from the oil, the saturation point should be outside the region of the voltage-carrying parts of the generator. The oil pressure is always kept lower than the hydrogen pressure in the generator and is preferably adjusted automatically by a regulating valve in dependence on the gas pressure.

The indication of leaks between the two cooling systems of the generator, that is, between hydrogen charge and oil cooling of the tubular conductors, is effected by an indicating device arranged in the oil circuit. To this end the hydrogen-saturated oil is conducted on the discharge side of the generator to a tank provided with a manometer, which is arranged in the oil circuit. If there is a leak in the oil circuit, hydrogen gas penetrates into the cooling oil system, so that the gas pressure in the tank rises, which is indicated by the manometer.

As already mentioned, the oil can also be saturated with another gas, for example, nitrogen, instead of with hydrogen. In the case of saturation with nitrogen, there is the possibility of a qualitative detection of the hydrogen penetration in the case of a leak.

The above described arrangement requires no continuous evacuation of the liquid, and any access of air into the closed cooling liquid circuit is quite impossible. Oxidation of the liquid is only possible up to a certain degree, insofar as the air is not completely evacuated from the liquid before the machine is started or as it has been displaced by the gas to be dissolved. Progressive oxidation, however, as it occurs with an incomplete vacuum, is not possible here.

A constructional example of the invention as applied to a hydrogen-cooled turbogenerator is shown schematically in the drawing.

The turbogenerator has a casing 1 containing the rotor 2 and the stator 3. The casing 1 which is of a gas-tight construction is charged with hydrogen gas supplied by way of conduit 4 from the gas cylinder 5. This cooling gas is circulated in a known manner along the air gap between the rotor and stator and also through axial cooling channels in the rotor. The stator winding 6 is provided with hollow conductors through which oil is circulated in a closed circuit comprising the cooling oil tank 7, motor-driven pump 8, cooler 9 and filter 10. The oil is kept automatically by means of a pressure regulator 12 and in dependence on the gas pressure at a pressure below that of the hydrogen gas charge. It enters the stator winding cooling ducts by way of the manifold 13 at a pressure somewhat above that of the ambient air and leaves the stator winding by way of manifold 14, returning to the oil tank 7 by way of conduit 15. The oil in the closed stator cooling circuit is de-aerated by connecting the tank 7 to a vacuum pump (not shown). The de-aerated cooling oil is saturated with an oil-inert gas, in this case hydrogen taken from the hydrogen cylinder 5 and supplied to the cooling circuit by way of valve 16 to the point of lowest pressure. The desired pressure drop in the system is provided by a diaphragm 18 located in conduit 15.

When a leak occurs between the rotor and stator cooling systems, hydrogen gas enters the cooling oil system, whereupon the pressure in tank 7 rises, this being indicated by a manometer 17 in communication with the tank.

I claim:
1. A combined cooling and coolant leak detection system for a dynamo electric machine such as a turbo-generator having a sealed casing containing stator and rotor elements comprising means for supplying and circulating a pressurized gaseous coolant through said casing in heat transfer relation with said rotor, means for supplying and circulating a pressurized de-aerated liquid coolant saturated with a gas inert with respect to the liquid through said stator in heat transfer relation with the current-carrying conductors thereon, the pressure of said liquid coolant being lower than the pressure of said gaseous coolant, and an indicating device connected to the circulation system of said liquid coolant for indicating any penetration of said gaseous coolant into the circulation system of said liquid coolant due to a leak in the latter within said casing.

2. A combined cooling and coolant leak detection system for a dynamo electric machine as defined in claim 1 wherein the pressure in the circulation system for the liquid coolant is somewhat above atmospheric at the inlet end to the conductors of said stator.

3. A combined cooling and coolant leak detection system for a dynamo electric machine as defined in claim 1 wherein said gaseous coolant and said inert gas are the same gas.

4. A combined cooling and coolant leak detection system for a dynamo electric machine as defined in claim 1 wherein said indicating device is pressure responsive.

5. A combined cooling and coolant detection system for a dynamo electric machine as defined in claim 1 wherein one gas is used for said gaseous coolant and a different gas is used for said inert gas by which said liquid coolant is saturated.

6. A combined cooling and coolant leak detection system for a dynamo electric machine as defined in claim 1 wherein saturation of said liquid coolant with said inert gas is effected at the point of lowest pressure in the circulating system and which point is located outside the region of the voltage-carrying parts of said dynamo electric machine.

References Cited in the file of this patent
UNITED STATES PATENTS

| | | |
|---|---|---|
| 2,675,493 | Grobel | Apr. 13, 1954 |
| 2,970,232 | Kilbourne | Jan. 31, 1961 |